United States Patent
Hsieh

[19]

[11] Patent Number: 5,975,365
[45] Date of Patent: Nov. 2, 1999

[54] BEVERAGE DISPENSING APPARATUS

[76] Inventor: Ming-Shien Hsieh, No. 6, Lane 1, Fu-Hsing St., Tai-Ping City, Taichung Hsien, Taiwan

[21] Appl. No.: 09/127,783

[22] Filed: Aug. 3, 1998

[51] Int. Cl.$^6$ ....................................................... B67D 5/56
[52] U.S. Cl. ..................................... 222/129.4; 222/129.3; 222/146.5; 222/146.6; 222/132
[58] Field of Search ............................... 222/129.4, 129.3, 222/146.5, 146.6, 132

[56] References Cited

U.S. PATENT DOCUMENTS

| | | | |
|---|---|---|---|
| 2,454,614 | 3/1948 | Goldberg | 222/129.3 |
| 3,207,376 | 9/1965 | Molitor | 222/129.3 |
| 4,211,342 | 7/1980 | Jamgochian et al. | 222/129.4 |
| 4,487,337 | 12/1984 | DeJardins | 222/129.3 |
| 4,649,809 | 3/1987 | Kanezashi | 222/129.4 |

*Primary Examiner*—Andres Kashnikow
*Assistant Examiner*—David Deal

*Attorney, Agent, or Firm*—Dickinson Wright PLLC

[57] ABSTRACT

A beverage dispensing apparatus includes a cold water storage tank with a cooling device to cool the water therein, a hot water storage tank with a heating device to heat the water therein, a first storage chamber for storing a first ingredient in liquid form, a second storage chamber for storing a second ingredient in powder form, a first metering unit associated with the first storage chamber to release a predetermined amount of the first ingredient from the first storage chamber, a second metering unit associated with the second storage chamber to release a predetermined amount of the second ingredient, a first mixing device associated with the first metering unit and the cold and hot storage tanks for mixing the released amount of first ingredient with cold or hot water, a second mixing device associated with the second metering unit and the cold and hot storage tanks for mixing the released amount of second ingredient with cold or hot water, and a control circuit device to control operation of the cooling and heating devices, the first and second metering units, and the first and second mixing devices so as to dispense a desired beverage mixture into a receptacle.

7 Claims, 5 Drawing Sheets

BEVERAGE DISPENSING APPARATUS

BACKGROUND OF THE INVENTION

1. Field of the Invention

The invention relates to a beverage dispensing apparatus, more particularly to a beverage dispensing apparatus which is capable of mixing a beverage ingredient with hot or cold water upon activation of a control circuit device so as to dispense a desired mixed beverage.

2. Description of the Related Art

A conventional beverage dispensing apparatus includes a plurality of containers containing various beverages and a control circuit device. Upon activation of the control circuit device, a selected one of the beverages will be released from the corresponding container so that the beverage can be collected in a receptacle.

A drawback of the conventional beverage dispensing apparatus resides in that the beverages in the containers have to be frequently replenished to maintain freshness. In addition, the taste of the dispensed beverages is fixed and cannot be adjusted as desired.

SUMMARY OF THE INVENTION

The main object of this invention is to provide a beverage dispensing apparatus which is capable of mixing a beverage ingredient with hot or cold water to obtain a desired mixed beverage that is dispensed into a receptacle.

Accordingly, a beverage dispensing apparatus of this invention includes a cold water storage tank, a hot water storage tank, a first storage chamber, a second storage chamber, a first metering unit, a second metering unit, a first mixing device, a second mixing device, and control circuit device. The cold water storage tank is adapted to be connected to a water supply to receive water therefrom, and has a cooling device operable so as to cool the water contained in the cold water storage tank. The hot water storage tank is adapted to be connected to the water supply to receive water therefrom, and has a heating device operable so as to heat the water contained in the hot water storage tank. The first storage chamber stores a first beverage ingredient in liquid form. Thesecond storage chamber stores a second beverage ingredient in powder form. The first metering unit is associated operably with the first storage chamber, and is operable so as to release a first predetermined amount of the first beverage ingredient from the first storage chamber. The second metering unit is associated operably with the second storage chamber, and is operable so as to release a second predetermined amount of the second beverage ingredient from the second storage chamber. The first mixing device has a first inlet valve that is connected to the cold water storage tank and that is operable so as to release cold water from the cold water storage tank thereinto, and a second inlet valve that is connected to the hot water storage tank and that is operable so as to release hot water from the hot water storage tank thereinto. The first mixing device is further connected to the first metering unit to receive the first predetermined amount of the first beverage ingredient therefrom, and further has a first mixer that is operable so as to mix the first predetermined amount of the first beverage ingredient with one of the hot and cold water from one of the first and second inlet valves to obtain a first beverage mixture, and a first discharge valve that is operable so as to be adapted to release the first beverage mixture into a receptacle. The second mixing device has a third inlet valve connected to the cold water storage tank and operable so as to release the cold water from the cold water storage tank thereinto, and a fourth inlet valve connected to the hot water storage tank and operable so as to release the hot water from the hot water storage tank thereinto. The second mixing device is further connected to the second metering unit to receive the second predetermined amount of the second beverage ingredient therefrom, and further has a second mixer that is operable so as to mix the second predetermined amount of the second beverage ingredient with one of the hot and cold water from one of the third and fourth inlet valves to obtain a second beverage mixture, and a second discharge valve that is operable so as to be adapted to release the second beverage mixture into a receptacle. The control circuit device is connected to and controls operation of the cooling device, the heating device, the first and second metering units, the first, second, third and fourth inlet valves, the first and second mixers, and the first and second discharge valves for dispensing a selected one of the first and second beverage mixtures into the receptacle.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
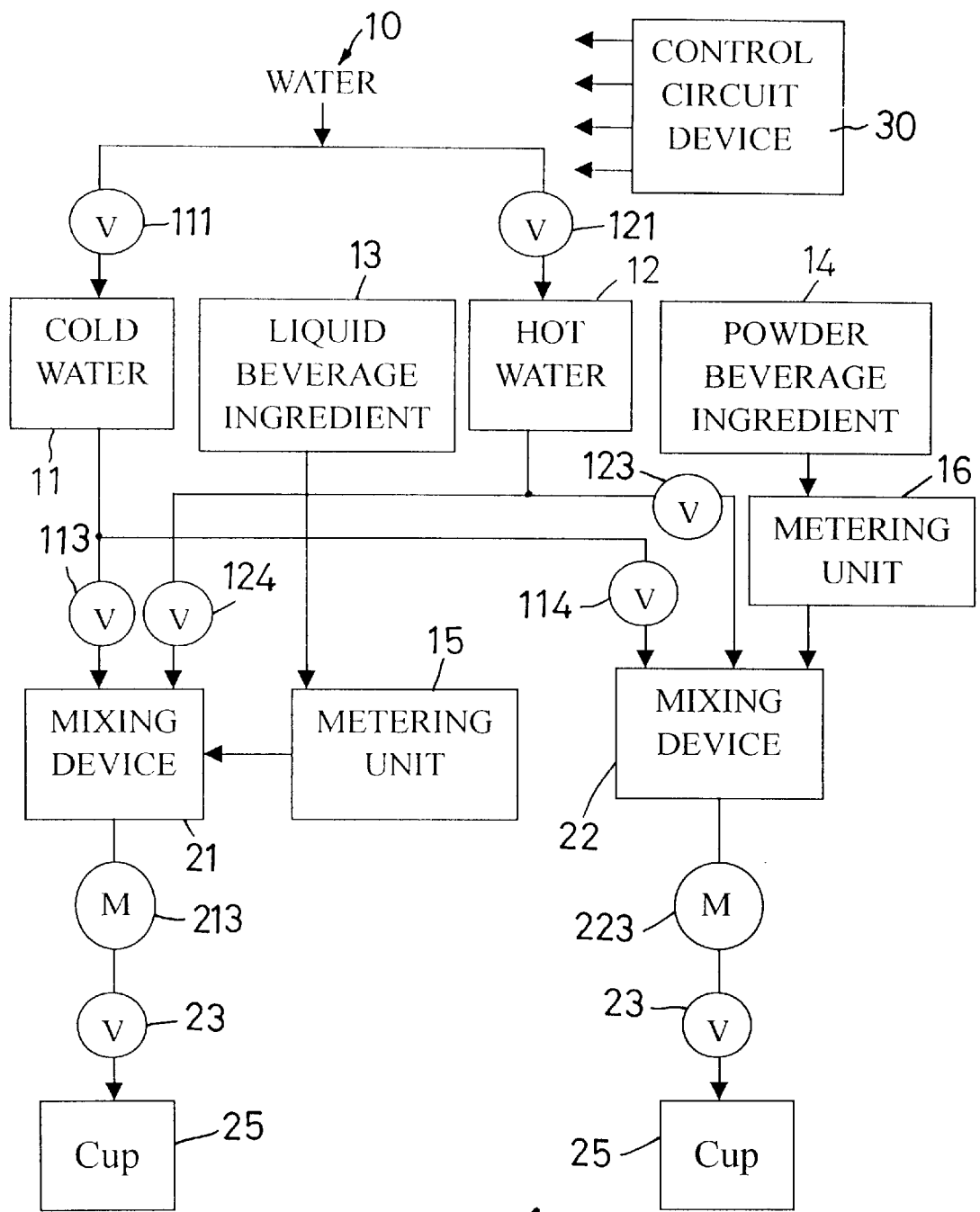
FIG. 1 is a block diagram illustrating a preferred embodiment of a beverage dispensing apparatus according to this invention.
Figure 2:
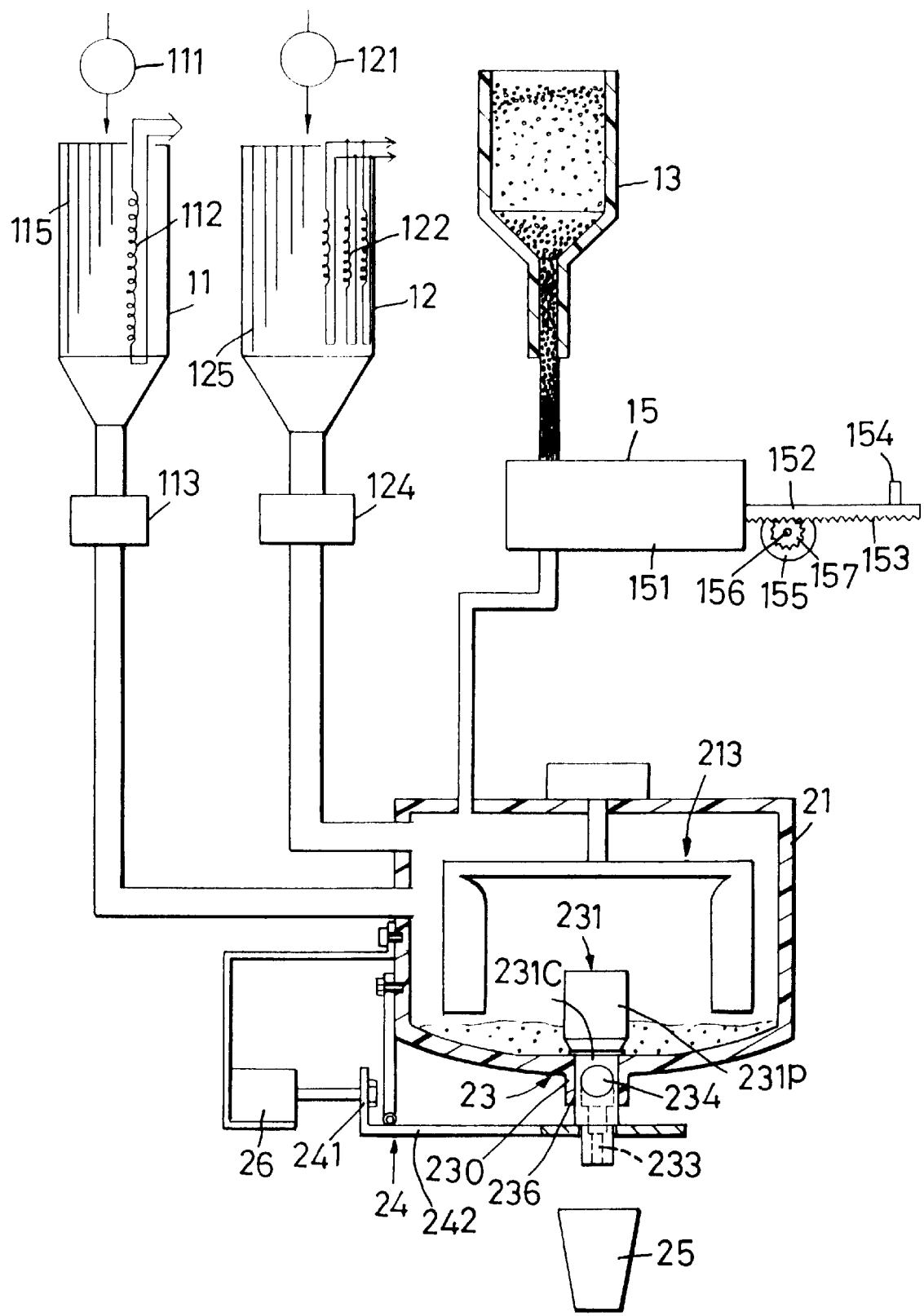
FIG. 2 is a schematic fragmentary view of the preferred embodiment, illustrating how a metered amount of a first beverage ingredient in liquid form is released from a first storage chamber.
Figure 3:
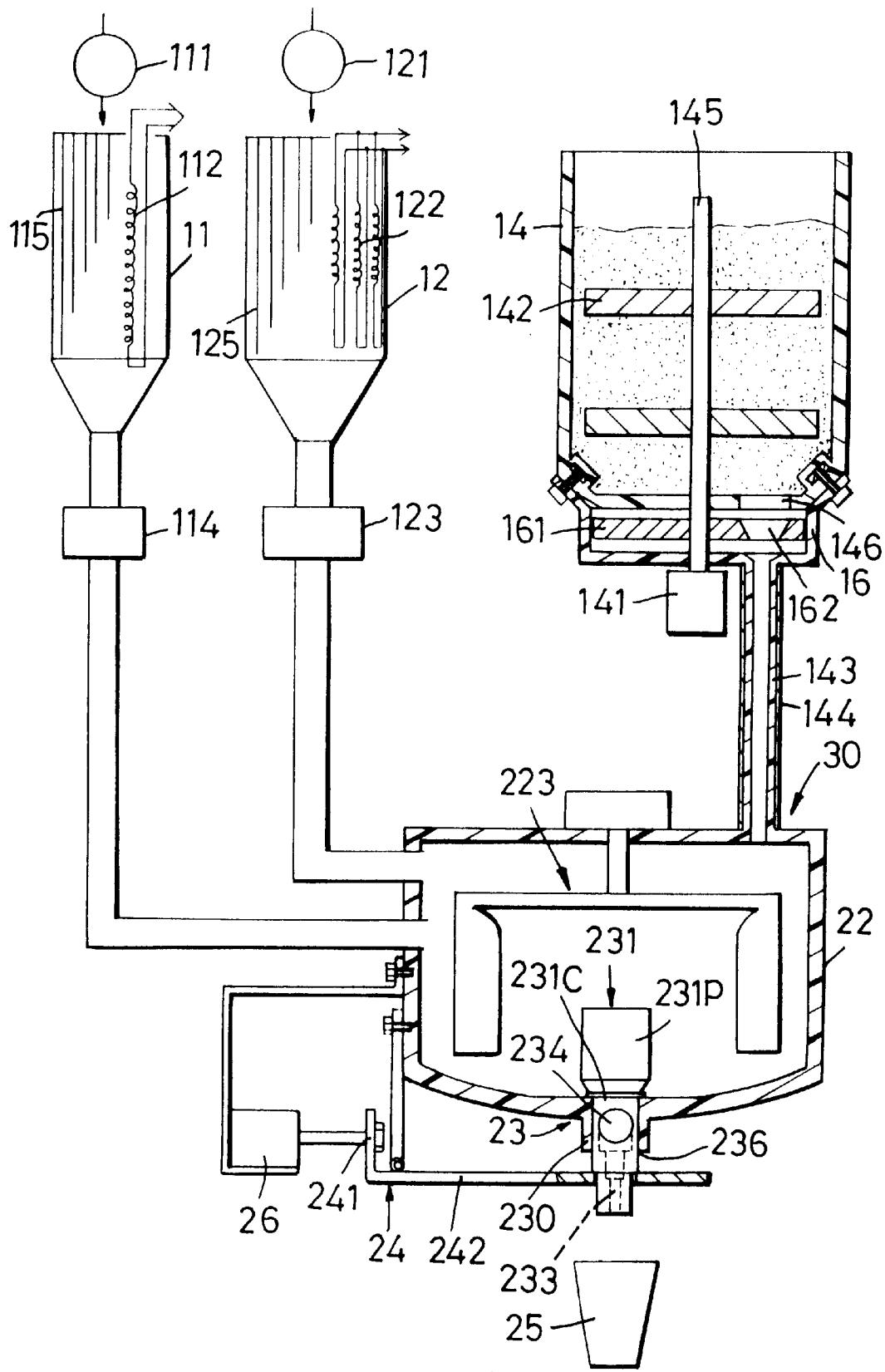
FIG. 3 is a schematic fragmentary view of the preferred embodiment, illustrating how a metered amount of a second beverage ingredient in powder form is released from a second storage chamber.

Referring to FIGS. 1, 2 and 3, the preferred embodiment of a beverage dispensing apparatus of this invention is shown to include a cold water storage tank 11, a hot water storage tank 12, a first storage chamber 13, a second storage chamber 14, a first metering unit 15, a second metering unit 16, a first mixing device 21, a second mixing device 22, and a control circuit device 30.

As illustrated, the cold water storage tank 11 is adapted to be connected to a water supply 10 to receive water therefrom, and has a cooling device 112 operable so as to cool the water contained in the cold water storage tank 11. The cooling device 112 maintains the temperature of the water inside the cold water storage tank 11 to about 4 degrees centigrade.

The hot water storage tank 12 is adapted to be connected to the water supply 10 to receive water therefrom, and has a heating device 122 operable so as to heat the water contained in the hot water storage tank 12. The heating device 122 maintains the temperature of the water inside the hot water storage tank 12 to about 90 degrees centigrade.

The first storage chamber 13 stores a first beverage ingredient in liquid form.

The second storage chamber 14 stores a second beverage ingredient in powder form.

The first metering unit 15 is associated operably with the first storage chamber 13, and is operable so as to release a first predetermined amount of the first beverage ingredient from the first storage chamber 13.

The second metering unit 16 is associated operably with the second storage chamber 14, and is operable so as to release a second predetermined amount of the second beverage ingredient from the second storage chamber 14.

The first mixing device 21 has first and second inlet valves 113, 124 (see FIG. 2) connected to the cold and hot water storage tanks 11, 12, respectively. The first inlet valve 113 is operable so as to release an appropriate amount of cold water from the cold water storage tank 11 into the first mixing device 21. The second inlet valve 124 is operable so as to release an appropriate amount of hot water from the hot water storage tank 12 into the first mixing device 21. The first mixing device 21 is further connected to the first metering unit 15 to receive the first predetermined amount of the first beverage ingredient therefrom, and further has a motor-powered first mixer 213 that is operable so as to mix the first predetermined amount of the first beverage ingredient with one of the hot and cold water from one of the first and second inlet valves 113, 124 to obtain a first beverage mixture, and a first discharge valve 23 that is operable so as to be adapted to release the first beverage mixture into a receptacle 25.

The second mixing device 22 has third and fourth inlet valves 114, 123 (see FIG. 3) connected to the cold and hot water storage tanks 11, 12, respectively. The third inlet valve 114 is operable so as to release an appropriate amount of cold water from the cold water storage tank 11 into the second mixing device 22. The fourth inlet valve 123 is operable so as to release an appropriate amount of the hot water from the hot water storage tank 12 into the second mixing device 22. The second mixing device 22 is further connected to the second metering unit 16 to receive the second predetermined amount of the second beverage ingredient therefrom, and further has a second mixer 223 that is operable so as to mix the second predetermined amount of the second beverage ingredient with one of the hot and cold water from one of the third and fourth inlet valves 114, 123 to obtain a second beverage mixture, and a second discharge valve 23 that is operable so as to be adapted to release the second beverage mixture into a receptacle 25.

The control circuit device 30 is connected to and controls the operations of the cooling device 112, the heating device 122, the first and second metering units 15, 16, the first, second, thirdandfourth inlet valves 113, 124, 114, 123, the first and second mixers 213, 223, and the first and second discharge valves 23 for dispensing a selected one of the first and second beverage mixtures into the receptacle 25.

In the preferred embodiment, each of the cold water and hot water storage tanks 11, 12 has a water inlet valve 111, 121 adapted to be connected to the water supply 10, and connected to and controlled by the control circuit device 30 to control supply of the water to the cold and hot water storage tanks 11, 12. Alternatively, with the provision of level sensors 115, 125 in the storage tanks 11, 12, the control circuit device 30 can control the inlet valves 111, 121 to supply water after every operation of the inlet valves 113, 124, 114, 123. A discharging tube 143 interconnects the second metering unit 16 and the second mixing device 22, and is provided with a heating unit 144 on an outer surface thereof. The heating unit 144 is connected to and is controlled by the control circuit device 30 to ensure smooth passage of the second beverage ingredient through the discharging tube 143.

Referring again to FIG. 2, the first storage chamber 13 is disposed above the first mixing device 21. The first metering unit 15 is disposed between the first storage chamber 13 and the first mixing device 21, and includes a pump device for drawing the first beverage ingredient from the first storage chamber 13 and for providing the first beverage ingredient drawn thereby to the first mixing device 21, and a sensor device 154 associated operably with the pump device to set the amount of the first beverage ingredient drawn by the pump device. Preferably, the pump device includes suction pump 151 having a piston shaft 152 formed with a rack 153, and a motor 155 having an output shaft 156 provided with a gear 157 that meshes with the rack 153. The sensor device 154 detects the rotation of the output shaft 156 or the displacement of the piston shaft 152, and provides the information to the control circuit device 30. As such, the control circuit device 30 can control the motor 155 in a first direction so that the suction pump 151 can draw a desired amount of the first beverage ingredient from the first storage chamber 13, and in a second direction so that the suction pump 151 can provide the first beverage ingredient drawn thereby to the first mixing device 21.

Referring again to FIG. 3, the second storage chamber 14 is disposed above the second mixing device 22. The second metering unit 16 is disposed between the second storage chamber 14 and the second mixing device 22. The second storage chamber 14 is formed with a bottom outlet port 146. The second metering unit 16 includes a metering plate 161 interposed between the bottom outlet port 146 and the second mixing device 22, and rotatable about a vertical axis, and a drive device 141 connected to and controlled by the control circuit device 30 for driving rotatably the metering plate 161. The metering plate 161 defines a passage 162 which is formed therethrough and which is offset to the vertical axis. The passage 162 permits discharge of the second beverage ingredient to the second mixing device 22 when aligned with the bottom outlet port 146. A stirrer 142 is disposed inside the second storage chamber 14 and is coupled to an output shaft 145 of the drive device 141 for stirring the second beverage ingredient in the second storage chamber 14.

By controlling the number of times, the passage 162 is aligned with the bottom outlet 146, the mount of the second beverage ingredient that is released from the second storage chamber 14 and that is provided to the second mixing device 22 can be controlled.

Figure 4:
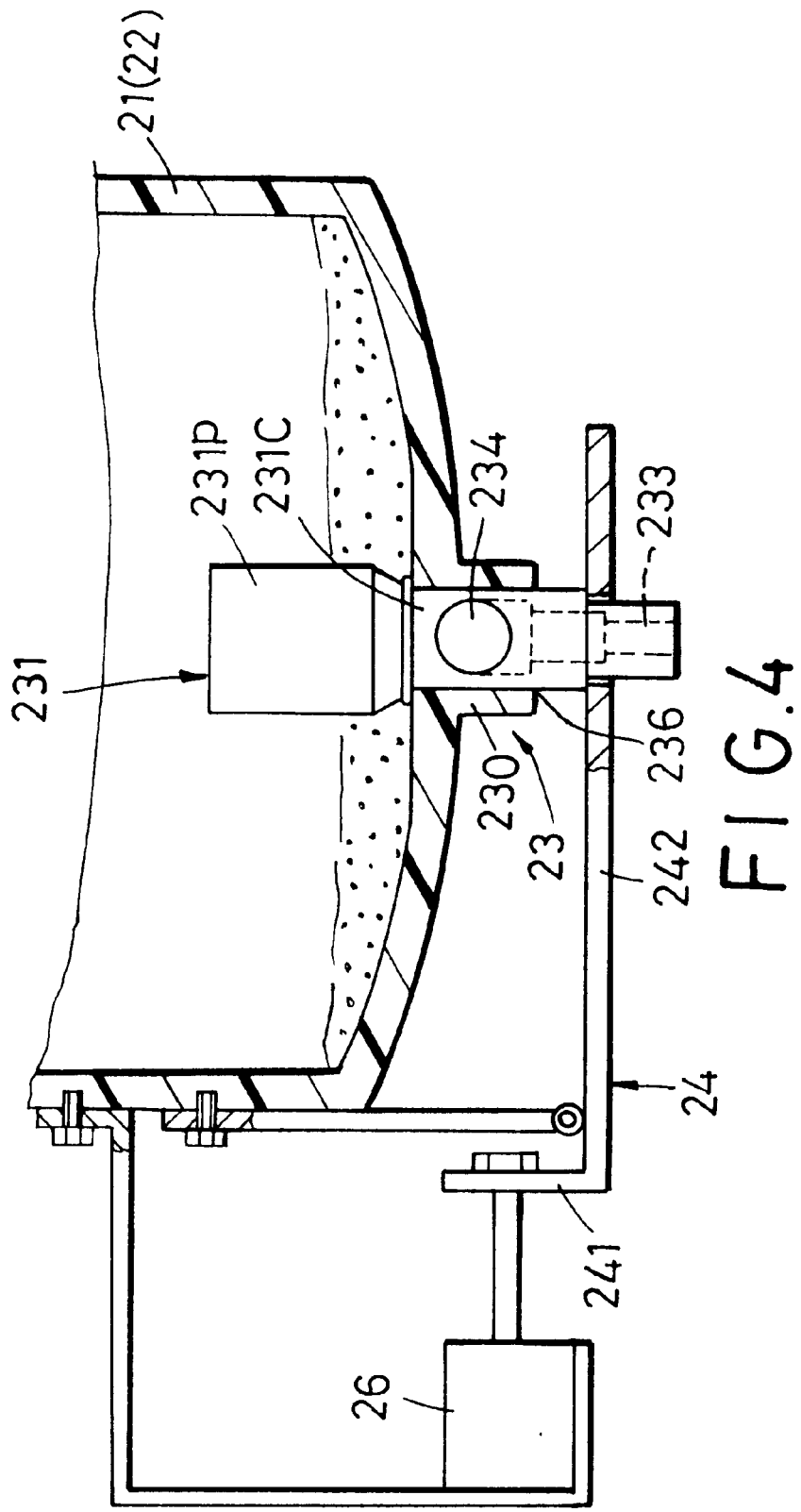
FIG. 4 is a fragmentary, partly sectional view of the preferred embodiment, illustrating a discharge valve of a mixing device.
Figure 5:
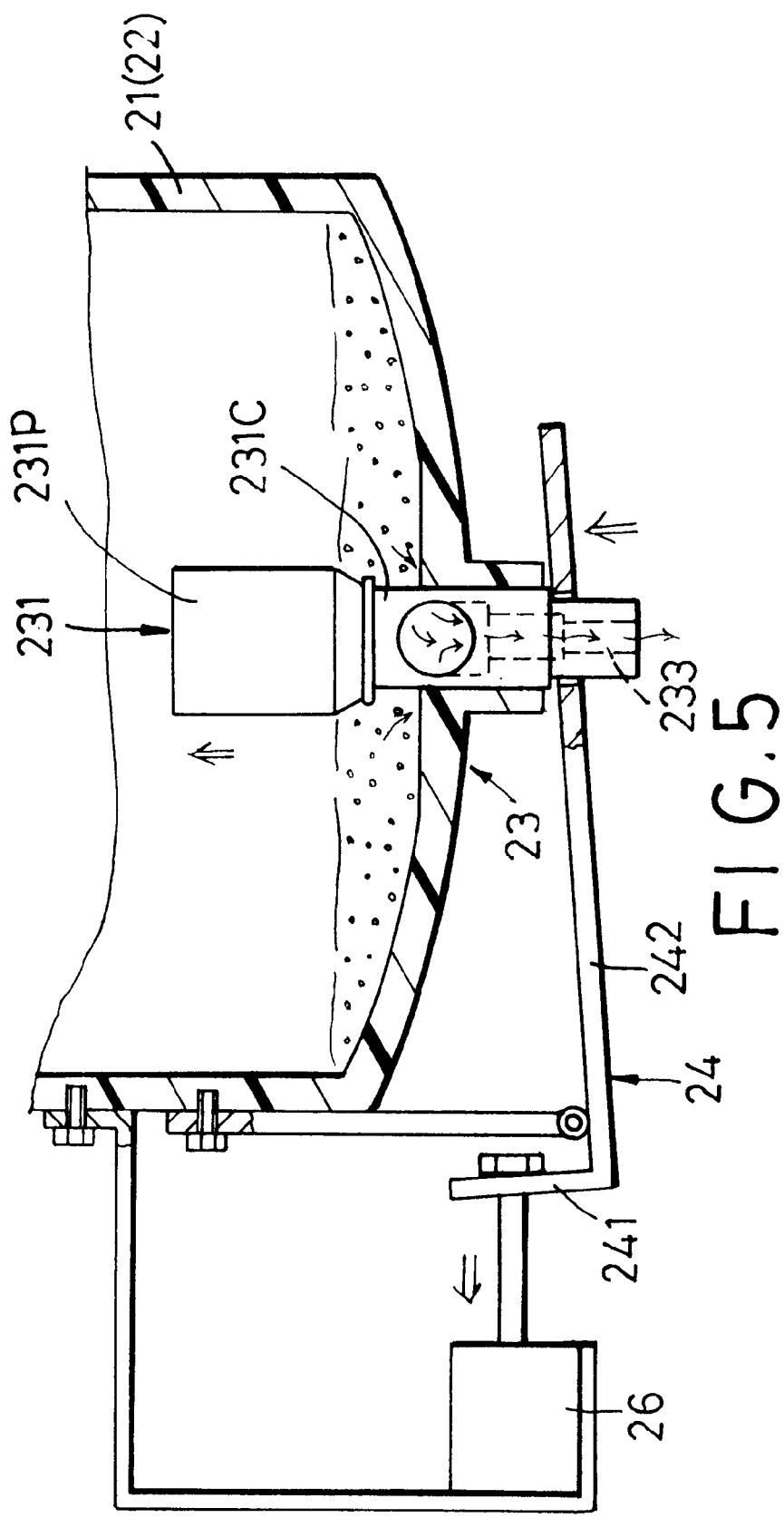
FIG. 5 is a fragmentary, partly sectional view of the preferred embodiment, illustrating how a mixed beverage is released by the discharge valve.

Referring to FIGS. 4 and 5, each of the first and second discharge valves 23 includes a discharge pipe 230 formed with an outlet hole 236, a plug unit 231, an L-shaped actuating rod 24, and a relay 26. The plug unit 231 has a plug portion 231P disposed in a respective one of the first and second mixing devices 21, 22, and a coupling portion 231C extending through the outlet hole 236 of the corresponding discharge pipe 230. The plug portion 213P normally blocks the outlet hole 236. The coupling portion 231C has an axial hole section 233 and a radial hole section 234 proximate to the plug portion 213P and connected to the axial hole section 233. The actuating rod 24 is disposed externally of a respective one of the mixing devices 21, 22, and has a first end portion 242 connected operably to the coupling portion 231C of the plug unit 231. The relay 26 is associated operably with a second end portion 241 of the actuating rod 24, and is connected to and controlled by the control circuit device 30 so as to drive the actuating rod 24 to move the plug unit 231 relative to the discharging pipe 230 so that a respective one of the first and second beverage mixtures is released via the radial hole section 234 and the axial hole section 233 in the coupling portion 231C.

With this invention thus explained, it is apparent that numerous modifications and variations can be made without departing from the scope and spirit of this invention. It is therefore intended that this invention be limited only as indicated in the appended claims.

I claim:

1. A beverage dispensing apparatus, comprising:

a cold water storage tank adapted to be connected to a water supply to receive water therefrom, and having a cooling device operable so as to cool the water contained in said cold water storage tank;

a hot water storage tank adapted to be connected to the water supply to receive water therefrom, and having a heating device operable so as to heat the water contained in said hot water storage tank;

a first storage chamber for storing a first beverage ingredient in liquid form;

a second storage chamber for storing a second beverage ingredient in powder form;

a first metering unit associated operably with said first storage chamber and operable so as to release a first predetermined amount of the first beverage ingredient from said first storage chamber;

a second metering unit associated operably with said second storage chamber and operable so as to release a second predetermined amount of the second beverage ingredient from said second storage chamber;

a first mixing device having a first inlet valve connected to said cold water storage tank and operable so as to release cold water from said cold water storage tank thereinto, and a second inlet valve connected to said hot water storage tank and operable so as to release hot water from said hot water storage tank thereinto, said first mixing device being further connected to said first metering unit to receive the first predetermined amount of the first beverage ingredient therefrom, and further having a first mixer that is operable so as to mix the first predetermined amount of the first beverage ingredient with one of the hot and cold water from one of said first and second inlet valves to obtain a first beverage mixture, and a first discharge valve that is operable so as to be adapted to release the first beverage mixture into a receptacle;

a second mixing device having a third inlet valve connected to said cold water storage tank and operable so as to release the cold water from said cold water storage tank thereinto, and a fourth inlet valve connected to said hot water storage tank and operable so as to release the hot water from said hot water storage tank thereinto, said second mixing device being further connected to said second metering unit to receive the second predetermined amount of the second beverage ingredient therefrom, and further having a second mixer that is operable so as to mix the second predetermined amount of the second beverage ingredient with one of the hot and cold water from one of said third and fourth inlet valves to obtain a second beverage mixture, and a second discharge valve that is operable so as to be adapted to release the second beverage mixture into a receptacle;

control circuit device connected to and controlling operation of said cooling device, said heating device, said first and second metering units, said first, second, third and fourth inlet valves, said first and second mixers, and said first and second discharge valves for dispensing a selected one of the first and second beverage mixtures into the receptacle.

2. The beverage dispensing apparatus as defined in claim 1, wherein each of said cold water and hot water storage tanks has a water inlet valve adapted to be connected to the water supply, and connected to and controlled by said control circuit device to control supply of the water to said cold water and hot water storage tanks.

3. The beverage dispensing apparatus as defined in claim 1, further comprising a discharging tube that interconnects said second metering unit and said second mixing device, and that is provided with a plurality of heating units on an outer surface thereof, said heating units being connected to and controlled by said control circuit device to ensure smooth passage of the second beverage ingredient through said discharging tube.

4. The beverage dispensing apparatus as defined in claim 1, wherein said first storage chamber is disposed above said first mixing device, and said first metering unit is disposed between said first storage chamber and said first mixing device, said first metering unit including pump device for drawing the first beverage ingredient from said first storage chamber, and for providing the first beverage ingredient drawn thereby to said first mixing device; and sensor device associated operably with said pump device to set the amount of the first beverage ingredient drawn by said pump device.

5. The beverage dispensing apparatus as defined in claim 1, wherein said second storage chamber is disposed above said second mixing device, and said second metering unit is disposed between said second storage chamber and said second mixing device, said second storage chamber being formed with a bottom outlet port, said second metering unit including a metering plate interposed between said bottom outlet port and said second mixing device, and rotatable about a vertical axis, and drive device connected to and controlled by said control circuit device for driving rotatably said metering plate, said metering plate defining a passage which is formed therethrough and which is offset to said vertical axis, said passage permitting discharge of the second beverage ingredient to said second mixing device when aligned with said bottom outlet port.

6. The beverage dispensing apparatus as defined in claim 5, wherein said second storage chamber has a stirrer disposed therein and coupled to said drive device for stirring the second beverage ingredient in said second storage chamber.

7. The beverage dispensing apparatus as defined in claim 1, wherein each of said first and second discharge valves includes:

a discharge pipe formed with an outlet hole;

a plug unit having a plug portion disposed in a respective one of said first and second mixing devices, and a coupling portion extending through said outlet hole of said discharge pipe, said plug portion normally blocking said outlet hole, said coupling portion having an axial hole section and a radial hole section proximate to said plug portion and connected to said axial hole section;

an actuating rod disposed externally of a respective one of said mixing devices, and having a first end portion connected operably to said coupling portion of said plug unit; and a relay associated operably with a second end portion of said actuating rod and connected to and controlled by said control circuit device so as to drive said actuating rod to move said plug unit relative to said discharging pipe so that a respective one of the first and second beverage mixtures is released via said radial hole section and said axial hole section in said coupling portion.

* * * * *